United States Patent [19]

Shimonou

[11] Patent Number: 5,020,044
[45] Date of Patent: May 28, 1991

[54] HEAD POSITIONING SYSTEM FOR USE IN INFORMATION RECORDING/REPRODUCING DEVICE WITH MEANS FOR DERIVING TRACK CROSSING SIGNAL FROM TRACKING ERROR SIGNAL

[75] Inventor: Shigeru Shimonou, Tokyo, Japan

[73] Assignee: NEC Corporation, Japan

[21] Appl. No.: 300,426

[22] Filed: Jan. 23, 1989

[30] Foreign Application Priority Data

Jan. 21, 1988 [JP] Japan .................................. 63-11923

[51] Int. Cl.$^5$ .......................... G11B 21/10; G11B 7/00
[52] U.S. Cl. ............................. 369/44.28; 369/44.25; 369/48; 369/124; 369/32
[58] Field of Search ...................... 369/33, 50, 54, 116, 369/44, 45, 44.25–44.35, 124, 32; 360/78.04, 77.03, 77.04; 358/907, 342

[56] References Cited

U.S. PATENT DOCUMENTS

| | | | |
|---|---|---|---|
| 4,615,023 | 9/1986 | Inada et al. | 369/44.28 |
| 4,719,610 | 1/1988 | Bates et al. | 369/44.28 |
| 4,788,421 | 11/1988 | Ogawa et al. | 369/44.11 |

Primary Examiner—Roy N. Envall, Jr.
Assistant Examiner—Thang V. Tran
Attorney, Agent, or Firm—Ostrolenk, Faber, Gerb & Soffen

[57] ABSTRACT

An optical disk system comprising a head positioning system for positioning a head at a desired one of the tracks of an optical disk, and a tracking servo system for maintaining the head at the track by detecting a tracking error signal indicating deflection of the head from the track. In order to accurately position the head to the desired track, a track crossing signal deriving circuit derives an alternating signal component having a frequency corresponding to track crossing of the head from the tracking error signal as a track crossing signal. The track crossing signal is converted to a pulse signal which is counted to produce a counted number as a track crossing number. The track crossing number is compared with a desired track number previously set and a position error signal is produced. A head driving motor is driven until the position error signal becomes zero so that the head is correctly positioned at the desired track. The track crossing signal is converted into a voltage signal as a velocity signal. A slew rate of the track crossing signal deriving circuit is controlled by the velocity signal so that the track crossing signal is reliably derived even if the track crossing velocity increases.

2 Claims, 3 Drawing Sheets

HEAD POSITIONING SYSTEM FOR USE IN INFORMATION RECORDING/REPRODUCING DEVICE WITH MEANS FOR DERIVING TRACK CROSSING SIGNAL FROM TRACKING ERROR SIGNAL

BACKGROUND OF THE INVENTION

1. Field of the Invention

The present invention relates to information recording/reproducing devices, and in particular, to a system for detecting a position of a write/read head for use in information recording/reproducing devices such as optical disc systems.

2. Description of the Prior Art

An information recording disk, for example, an optical disk has a plurality of information recording tracks onto which information is read using an appropriate transducer or write/read head. The head comprises a light source such as a semiconductor laser for emitting a light beam and an optical system for focusing the light beam as a small beam spot onto a track so as to write or read information onto or from the track. In order to write or read information onto or from a desired one of the tracks, the head must be correctly positioned at the desired track.

In the prior art, a desired head travelling amount is set as a position difference between a current position of the head and a desired track position. An actual travelling amount is subtracted from the desired head travelling amount to produce a position error signal becomes zero so that the head is positioned at the desired track.

U.S. Pat. No. 4,615,023 by Inada et al., assigned to NEC Corporation, discloses a head position detector mounted on the head for detecting the current position of the head so as to detect the actual head travelling amount. However, measurement of the actual head travelling amount by the head position detector is not based on detection of the number of tracks crossed by the head so that high measuring accuracy is not expected.

In the prior art, a known optical disk system is further provided with a tracking error detecting device for detecting deflection of the small beam spot from the desired track as a tracking error signal. The optical system, in particular an objective lens in the optical system, is controlled until the tracking error signal becomes zero to position the small beam spot at a center of the track. The above-described U.S. Patent also discloses such a tracking error detecting device as a tracing position detector.

When the head moves so that the small beam spot crosses those tracks, the tracking error signal is an alternating (AC) signal having an alternating rate corresponding to the track crossing rate. Accordingly, it may theoretically be possible to count a track crossing time number by detecting zero-cross points of the tracking error signal.

However, the tracking error signal includes high frequency noise components caused by track position information previously recorded on the disk etc. Accordingly, it is difficult to reliably detect the zero cross points of the tracking error signal.

Summary of the Invention

It is an object of the present invention to provide a system for use in an information recording/reproducing system wherein a head travelling amount is reliably detected as a track crossing time number of the head independently of head travelling velocity.

The present invention is applicable to a head positioning system for use in an information recording/reproducing system. The information recording/reproducing system comprises a write/read head for a desired one of recording tracks of an information recording disk, a tracking error detecting means for detecting a deflection of the head from a center of the desired track to produce a tracking error signal. The tracking error signal comprises an alternating signal component representing the track crossing of the head and noise components when the head travels along the disk at a travelling velocity. The head positioning system comprises head driving motor means for driving the head along the information recording disk and motor driving control means responsive to a position error signal to control operation of the head driving motor means. According to the present invention, the head positioning system comprises track crossing signal deriving means for deriving the alternating signal component as a track crossing signal from the tracking error signal; track crossing number counting means responsive to the track crossing signal for transforming the track crossing signal into a pulse signal and for counting pulses of the pulse signal to produce a counted number as a current track position; and position error calculating means coupled to the track crossing number counting means for comparing the current track position and a desired track number previously set thereto to produce an error between the current track position and the desired track number as the position error signal, the motor driving control means responsive to the position error signal for driving the head driving motor means until the position error signal becomes zero.

According to an aspect of the present invention, the head positioning system further comprises frequency to voltage converting means coupled to the track crossing signal deriving means for converting the track crossing signal into a voltage signal having a voltage level corresponding to a frequency of the track crossing signal to deliver the voltage signal as a velocity signal, the motor driving control means being responsive to the velocity signal and controlling a rotating speed of the head driving motor means.

According to another aspect of the present invention, the head positioning system the track crossing signal deriving means comprises current control means responsive to the velocity signal for producing a DC current having a current level corresponding to an absolute value of the velocity signal, and a diode circuit having a slew rate for permitting the alternating signal component to pass therethrough as the track crossing signal with removing the noise components, the slew rate being controlled by the DC current so that the alternating signal component reliably passes even if the frequency of the alternating signal component increases.

DESCRIPTION OF PREFERRED EMBODIMENTS

Figure 1:
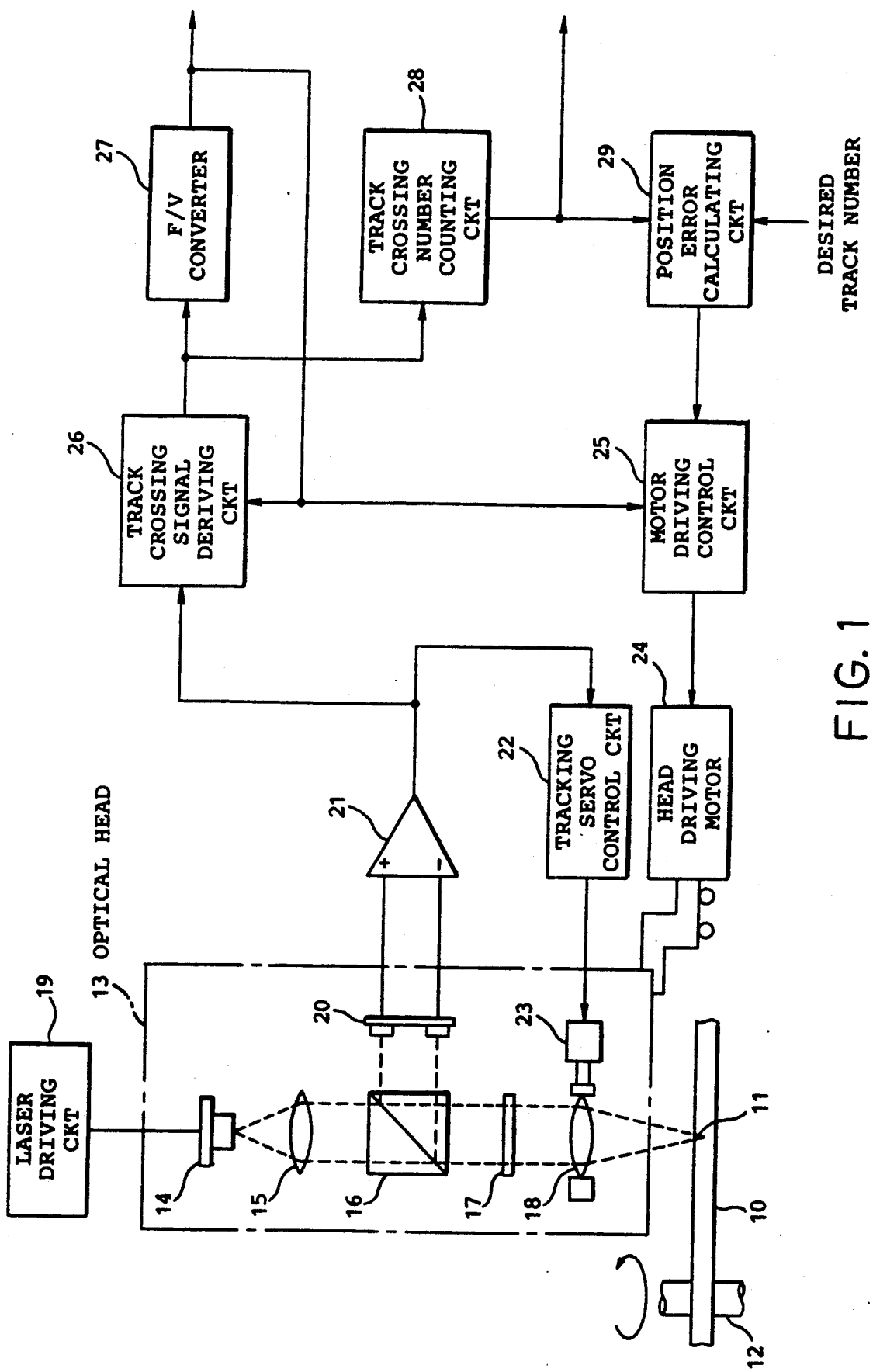
FIG. 1 is a block diagram view illustrating an optical disk system using a head positioning system according to an embodiment of the present invention.

Referring to FIG. 1, the optical disk system shown therein performs information recording/reproducing operation for an optical disk 10 which has a plurality of information recording tracks (one of which is shown at 11) formed thereon with a pitch of, for example, 1.6 $\mu$m.

The system comprises a rotary shaft 12 driven by an appropiate driving motor (not shown) for rotating the optical disk 10 set thereon, and an optical head 13 for writing information onto or reading information from one of the tracks on the optical disk 10.

The optical head 13 comprises a semiconductor laser 14 for radiating a light beam used for writing/reading information, a collimate lens 15 for adjusting the light beam into a parallel light beam, a beam splitter 16 for splitting the original or forward light beam and the reflected or backward light beam, a quarter wavelength retardation plate 17 for converting the original light of a linear polarization to a circularly polarized beam and converting the circularly polarized backward light beam to a linear polarized beam, an objective lens 18 for focusing the original light beam to form a small beam spot having a diameter, for example, 1 $\mu$m on the disk 10 and for transforming the reflected light beam from the disk 10 to a parallel light beam.

The system further comprises a laser driving circuit 19 for energizing the semiconductor laser 14 to emit the light beam.

In order to write/read information for the track 11 on the disk 10, the small beam spot must be kept on the desired track. To this end, the system is provided with a tracking servo system.

The tracking servo system comprises a tracking error sensor 20 comprising a pair of photo sensors mounted on the head 13 so that the tracking error sensor 20 receives the reflected light beam split by the beam splitter 16. When the small beam spot is positioned at a center of the track 11, the reflected light beam has a symmetric light strength pattern so that the paired photo sensors of the tracking error sensor 20 produce detection signals of a substantially equal level. However, when the small beam is deflected from the center of the track 11, the light strength pattern of the reflected light beam is asymmetric. Therefore, the paired sensors of the tracking error sensor 20 produce detection signals of different levels. The detected signals are supplied to a differential amplifier 21 to produce a tracking error signal. When the small beam spot is positioned at the center of the track 11, the error signal is at 0 level. On the other hand, when the small beam spot is deflected from the center of the track 11, the error signal has a level corresponding to a level difference between the detection signals from the tracking error sensor 20. The tracking error signal is applied to a tracking servo control circuit 22. The tracking servo control circuit 22 produces a control signal in response to the tracking error signal to deliver the control signal to a lens actuator 23 mounted on the head 13. The lens actuator 23 moves the lens 18 under control of the tracking error signal to position the small beam spot at the center of the track so that the tracking error signal has 0 level.

The tracking servo system is known in the prior art and, therefore, further detailed description thereto is omitted here.

In order to move the head 13 toward a desired one of the tracks, the optical disk system further comprises a head driving motor 24 for moving the head 13 along the optical disk 10 and a motor driving control circuit 25 for controlling the head driving motor 24.

In order to move the head driving motor 24 until the head 13 reaches the desired track 11 and to stop the head driving motor 24 at the desired track 11, the motor driving control circuit 25 is supplied with a position error signal which indicates an error of the current position of the head 13 from the desired track 11.

The position error signal is produced by circuits 26–29 according to the present invention.

A track crossing signal deriving circuit 26 is supplied with the tracking error signal from the differential amplifier 21 and derives a track crossing signal from the tracking error signal by removing high frequency noise components therefrom.

Since the tracking error signal indicates deflection of the small beam spot from the track as described above, the tracking signal has an alternating (AC) signal component in response to track crossing of the small beam spot and other high frequency noise components caused by address information recorded on the optical disk 10 and others, as described in the preamble.

The track crossing signal deriving circuit 26 removes those noise components and derives the alternating signal component as the track crossing signal.

The track crossing signal is applied to a frequency to voltage (F/V) converter 27 which, in turn, converts the track crossing signal into a voltage signal as a velocity signal indicating a moving velocity of the head 13. The velocity signal is used by the track crossing signal deriving circuit 26 to control the deriving operation as described below.

The track crossing signal is also applied to a track crossing number counting circuit 28. The track crossing number counting circuit 28 transforms the track crossing signal of the alternating signal into a pulse signal and counts the pulses. A counted number indicates the track crossing number and is supplied to a position error calculating circuit 29.

The position error calculating circuit 29 is supplied with a position or a number of a desired track previously set as a desired track number and compares the track crossing number and the desired track number to produce an error signal as the position error signal.

The position error signal is applied to the motor driving control circuit 25.

The motor driving control circuit 25 drives the head driving motor 24 in response to the position error signal until the position error signal becomes zero.

The velocity signal is also applied to the motor control circuit 25 from the frequency to voltage converter 27. The motor control circuit 25 controls a rotating velocity of the head driving motor 24 in response to the velocity signal.

A slew rate limiting circuit is used as the track crossing signal deriving circuit 26.

Figure 2:
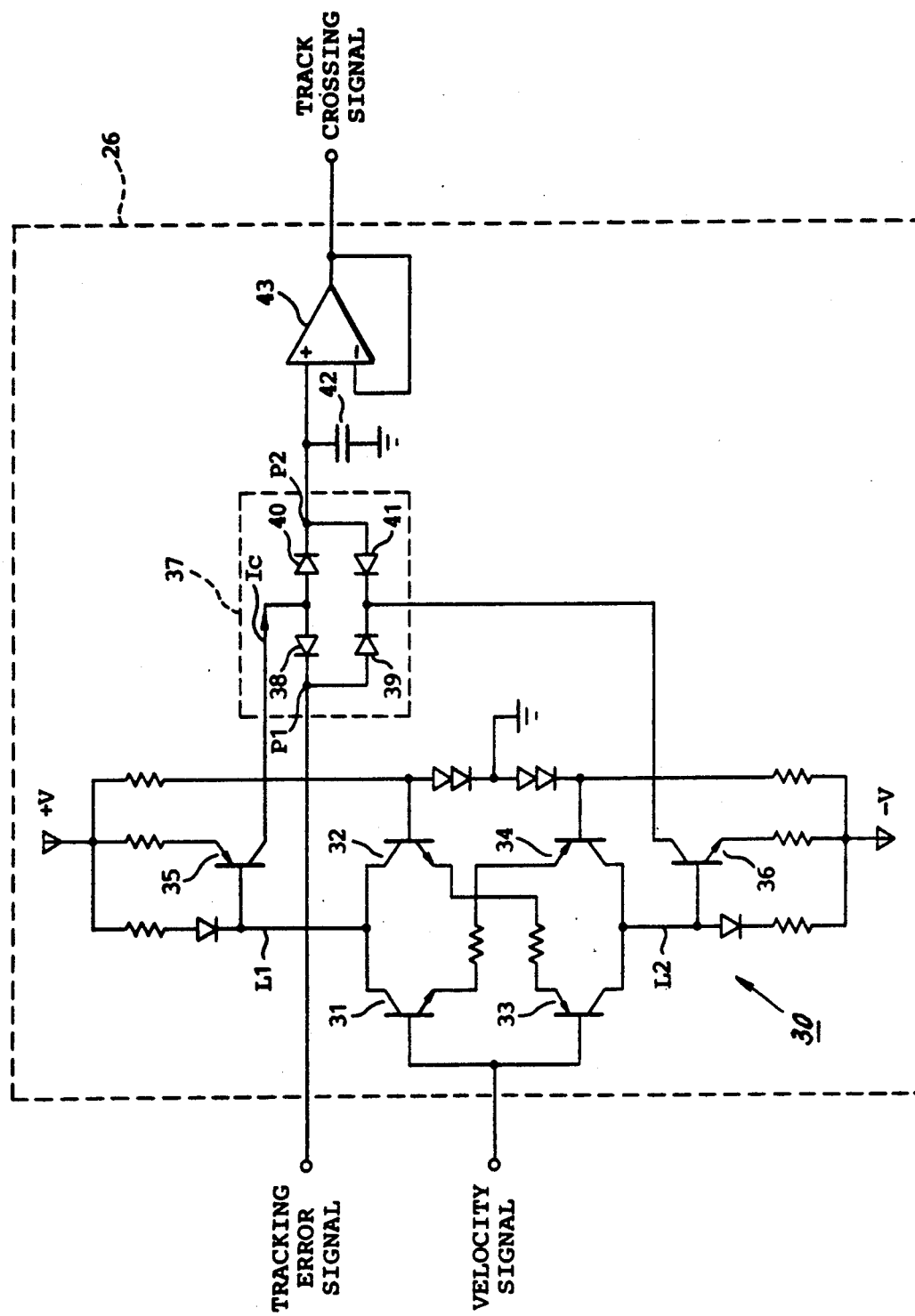
FIG. 2 is a circuit diagram illustrating a track crossing signal deriving circuit in FIG. 1.
Figure 3A:
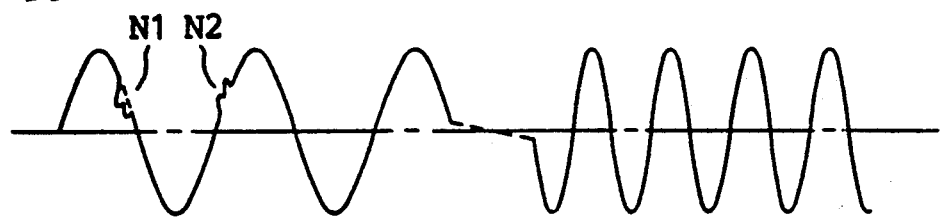
FIG. 3 is a view illustrating waveforms of signals at different points in the circuit of FIG. 1.
Figure 3B:
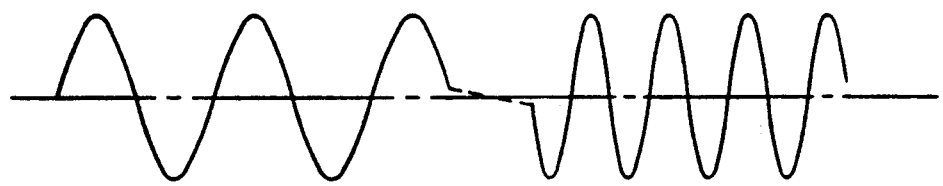
Figure 3C:
Figure 3D:
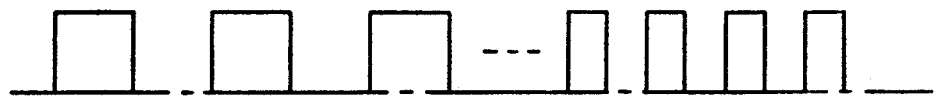

Referring to FIG. 2, the slew rate limiting circuit comprises a current control circuit 30 for producing a DC current having a current level corresponding to an absolute value of the velocity signal. The current control circuit 30 comprises a pair of NPN transistors 31 and 32 having collectors commonly connected to a positive voltage source +V through a common collector line L1 and a pair of PNP transistors 33 and 34 having collectors commonly connected to a negative voltage source −V through another common collector line L2. Bases of NPN transistor 32 and the PNP transistor 34 are biased by a constant positive voltage and a constant negative voltage, respectively, so that those NPN and PNP transistors 32 and 34 are conductive. On the other hand, the velocity signal is commonly applied to bases of the PNP transistor 31 and NPN transistor 33 so that one of those NPN and PNP transistors 31 and 33 is made conductive in response to a positive or negative level, respectively of the velocity level. Emitters of the NPN transistor 31 and the PNP transistor 34 are connected to each other through an emitter resistor and emitters of the NPN transistor 32 and the PNP transistor 35 are connected to each other through another emitter resistor. Accordingly, the current flowing through the common corrector lines L1 and L2 from the positive voltage source +V to the negative voltage source −V is dependent on the absolute value of the velocity signal. Further, a PNP transistor 35 and an NPN transistor 36 are serially connected through a diode circuit 37 between the positive and the negative voltage sources +V and −V. Bases of the PNP transistor 35 and the NPN transistor 36 are connected to the common collector lines L1 and L2, respectively. Therefore, a current Ic flowing through the transistors 35 and 36 is determined by the current flowing through the common collector lines L1 and L2 and therefore, are dependent on the absolute value of the velocity signal.

The diode circuit 37 comprises two diodes 38 and 39 serially connected between collectors of the PNP transistor 35 and the NPN transistor 36, and two diodes 40 and 41 connected in parallel with the diodes 38 and 39. The tracking error signal is applied to one common connection point P1 of the two diodes 38 and 39 and a capacitor 42 is connected to the other common connecting point P2 of the other two diodes 40 and 41.

When the voltage at the point P1 increases in positive level, the diode 38 becomes non-conductive, so that the current Ic flows through the diode 40 and is supplied to the capacitor 42. Therefore, the capacitor 42 is charged until the voltage at P2 elevates that which causes the diode 40 to become non-conductive. Then, the capacitor 42 starts to discharge through the diode 41. On the other hand, when the voltage at point P1 decreases into the negative level, the diode 38 is made conductive and the diode 40 is made non-conductive so that the capacitor 42 continues the discharge. Therefore, the voltage E at the point P2 varies as a function of the level variation of the tracking error signal. However, the variation rate of the voltage E is made slow because the current Ic is limited by the current control circuit 30.

Assuming that the capacitance of the capacitor 42 is given by $C_0$, it will be understood from the above description that the variation rate $(dE/dt)$ of the voltage E is $(Ic/C_0)$ at maximum. That is, the slew rate of the diode circuit is determined by $(Ic/C_0)$. In this connection, since the Ic is determined by the velocity signal, the slew rate is also controlled by the velocity signal.

Therefore, the high frequency components of the tracking error signal can be removed and the alternating signal component indicating the track crossing of the small beam spot is derived from the voltage at point P2. The derived alternating signal component is amplified by a buffer amplifier 43 and is delivered as the track crossing signal to the frequency to voltage converter 27 and the track crossing number counting circuit 28.

When the moving speed of the head increases so that the track crossing signal component has an increased frequency, the track crossing signal can reliably be obtained at the output of the buffer amplifier 43, because the slew rate is controlled by the velocity signal.

Now, operation of the device will be described below.

Referring to FIG. 3 in addition to FIGS. 1 and 2, the tracking error signal A is obtained from the differential amplifier 21 according to the movement of the head 13. The tracking error signal A comprises the alternating signal component due to track crossing of the small beam spot and noise components N1 and N2 carried thereon.

The tracking error signal A is applied to the track crossing signal deriving circuit 26 and the noise components N1 and N2 are removed and the track crossing signal B is obtained.

The tracking error signal B is converted to the velocity signal C at the frequency to voltage converter 27. The velocity signal B is applied to the track crossing signal deriving circuit 26 to control the slew rate of the circuit 26. Therefore, even if the moving speed of the head 13 varies, the track crossing signal can reliably be obtained by the circuit 26.

The track crossing number counting circuit 28 converts the track crossing signal B into a pulse signal D and counts the pulses of the pulse signal to deliver a counted number to the position error calculating circuit 29.

The position error calculating circuit 29 compares the counted number and the desired track number previously set to produce the position error signal to the motor control circuit 25.

Thus, the head 13 is reliably positioned to the desired track 11 on the optical disk 10.

What is claimed is:

1. In a head positioning system for use in an information recording/reproducing system comprising a write/read head for a desired one of recording tracks of an information recording disk, a tracking error detecting means for detecting a deflection of the head from a center of the desired track to produce a tracking error signal, said tracking error signal comprising an alternating signal component representing said track crossing of the head and noise components when said head travels along said disk at a travelling velocity, said head positioning system comprising head driving motor means for driving said head along said information recording disk and motor driving control means responsive to a position error signal to control operation of said head driving motor means, wherein the improvement comprises:

a velocity detecting means for generating a velocity signal indicative of a moving velocity of said head relative to said information recording disk during access to a track of said information recording disk;

said motor driving control means being responsive to said velocity signal and controlling a rotating speed of said head driving motor means;

track crossing signal deriving means for deriving said alternating signal component as a track crossing signal from said tracking error signal, said track crossing signal deriving means comprising current control means responsive to said velocity signal for producing a DC current having a current level corresponding to an absolute value of said velocity signal, and a diode circuit having a slew rate for permitting said alternating signal component to pass therethrough as said track crossing signal with removing said noise components, said slew rate being controlled by said DC current so that said alternating signal component reliably passes even if the frequency of said alternating signal component increases;

track crossing number counting means responsive to said track crossing signal for transforming said track crossing signal into a pulse signal and for counting pulses of said pulse signal to produce a counted number as a current track position; and position error calculating means coupled to said track crossing number counting means for comparing said current track position and a desired track number previously set thereto to produce an error between said current track position and said desired track number as the position error signal, said motor driving control means responsive to said position error signal for driving said head driving motor means until said position error signal becomes zero.

2. A head positioning system as claimed in claim 1, wherein said velocity detecting means comprises frequency to voltage converting means coupled to said track crossing signal deriving means for converting said track crossing signal into a voltage signal having a voltage level corresponding to a frequency of said track crossing signal to deliver said voltage signal as said velocity signal.

* * * * *